United States Patent [19]

Jägers

[11] Patent Number: 5,317,982
[45] Date of Patent: Jun. 7, 1994

[54] SHIP

[76] Inventor: Leopold Jägers, Billigerstrasse 125, 5350 Euskirchen, Fed. Rep. of Germany

[21] Appl. No.: 946,833

[22] Filed: Sep. 17, 1992

[30] Foreign Application Priority Data

Sep. 21, 1991 [DE] Fed. Rep. of Germany ....... 4131464
Feb. 12, 1992 [DE] Fed. Rep. of Germany ....... 4204110

[51] Int. Cl.$^5$ .............................................. B63B 1/00
[52] U.S. Cl. ........................................ 114/56; 440/53; 114/288
[58] Field of Search ............... 114/56, 57, 63, 288, 114/290, 291; 440/53, 79

[56] References Cited

U.S. PATENT DOCUMENTS

| 688,672 | 12/1901 | Niemeyer | 114/63 |
|---|---|---|---|
| 1,010,376 | 11/1911 | Keissler | 114/56 |
| 2,619,930 | 12/1952 | Hoke | 114/57 |
| 2,710,587 | 6/1955 | Kutchar | 114/57 |
| 2,747,536 | 5/1956 | Russell | 114/57 |
| 3,677,212 | 7/1972 | Gregoire | 114/61 |
| 3,722,456 | 3/1973 | Lambrecht et al. | |
| 3,937,164 | 2/1976 | Austin | 114/67 A |

FOREIGN PATENT DOCUMENTS

| 0298051A1 | 1/1989 | European Pat. Off. |  |
|---|---|---|---|
| 1112421 | 8/1961 | Fed. Rep. of Germany . | |
| 8119179 | 12/1987 | Fed. Rep. of Germany . | |
| 9000582 | 3/1990 | Fed. Rep. of Germany . | |
| 494641 | 9/1919 | France | 440/79 |
| 2408506 | 6/1979 | France . | |
| 2579166 | 9/1986 | France . | |

Primary Examiner—Jesus D. Sotelo
Attorney, Agent, or Firm—Herbert Dubno; Yuri Kateshov

[57] ABSTRACT

A displacement ship having a hull, a stern 6 which at least in the region of the underwater body form a flat surface to which the longitudinal axis of the ship is a normal, the hull at least in the region of the underwater body, narrowing towards the stern 6 neither with the side surfaces 1a, 1b nor with the bottom 1c.

10 Claims, 10 Drawing Sheets

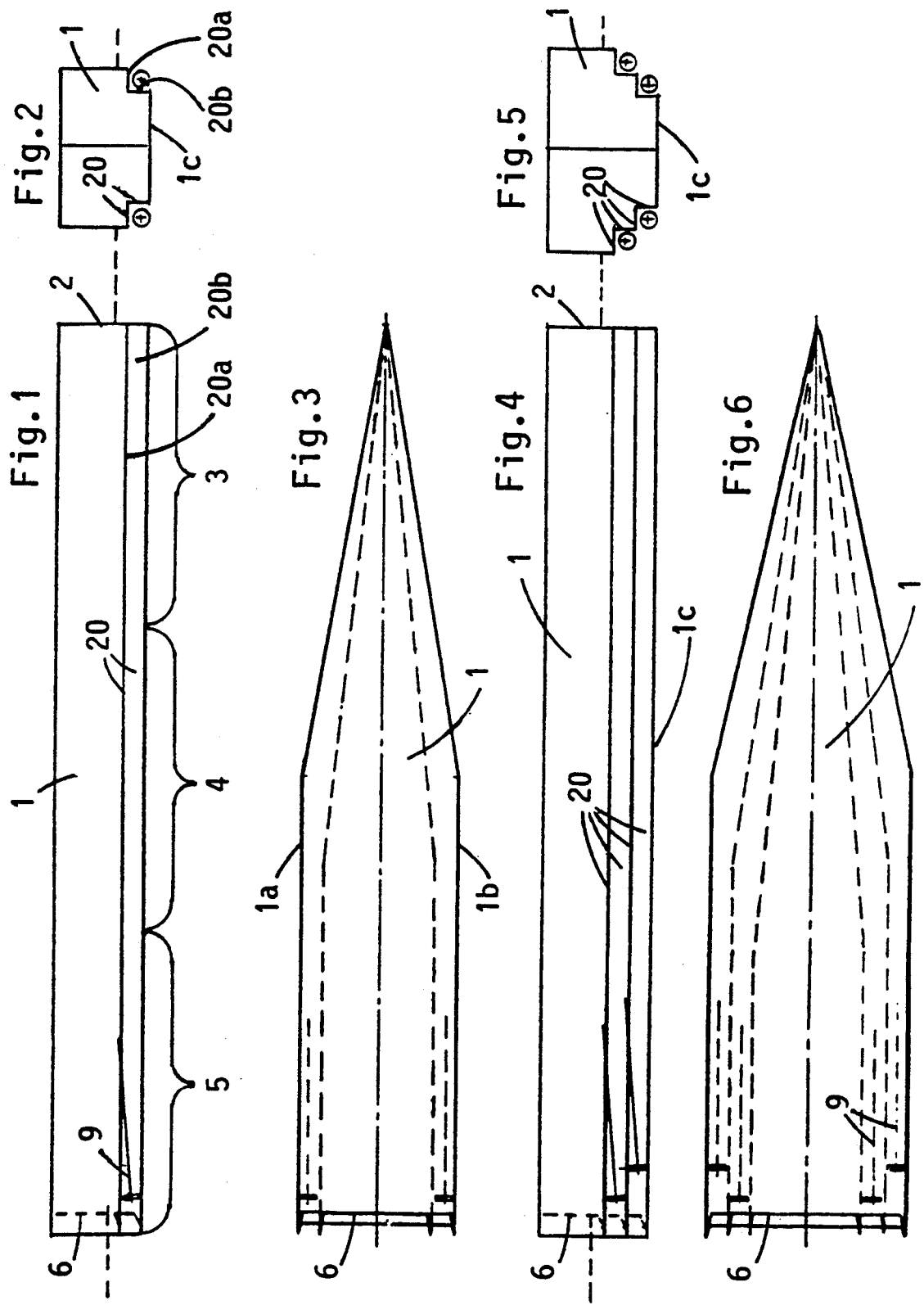

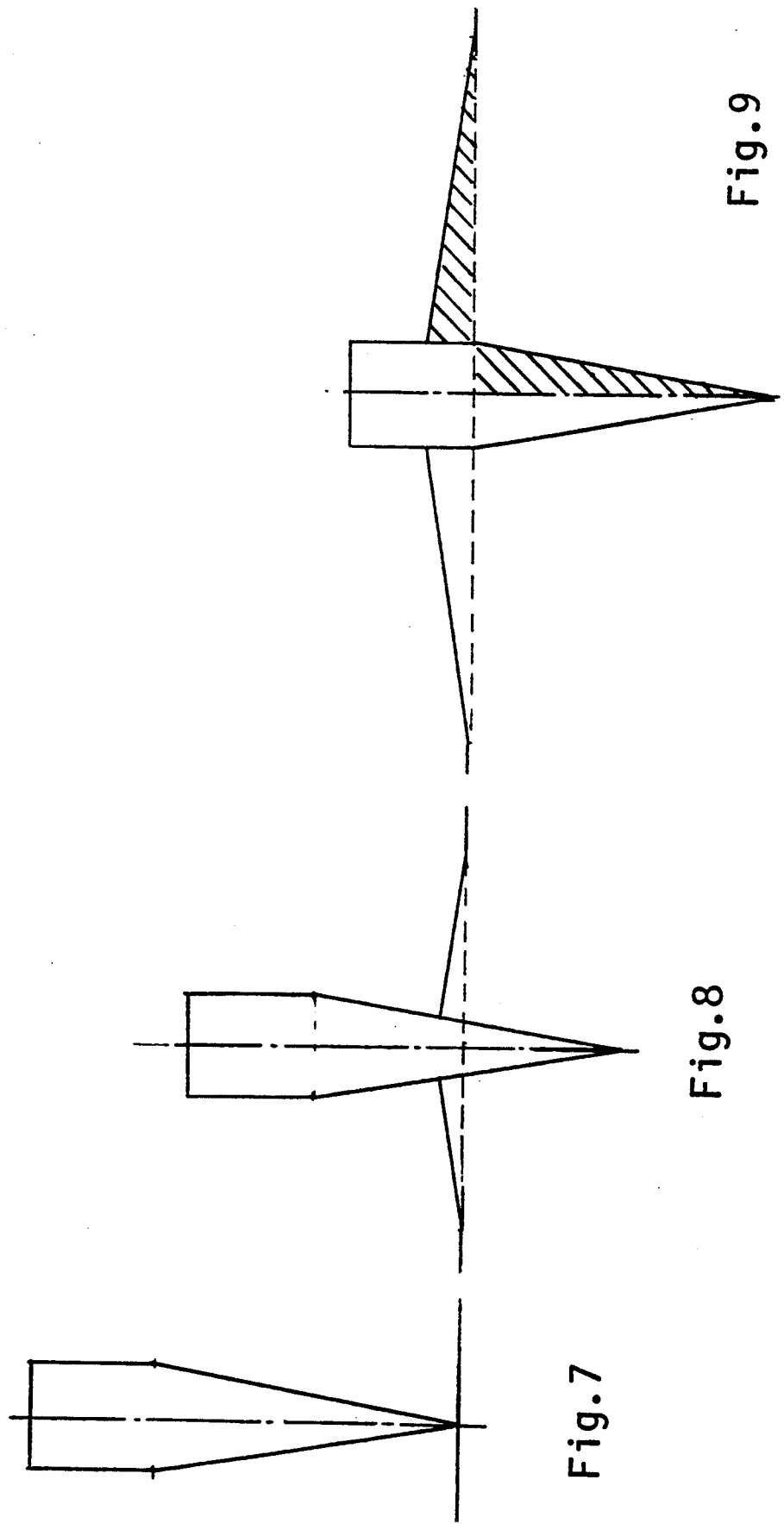

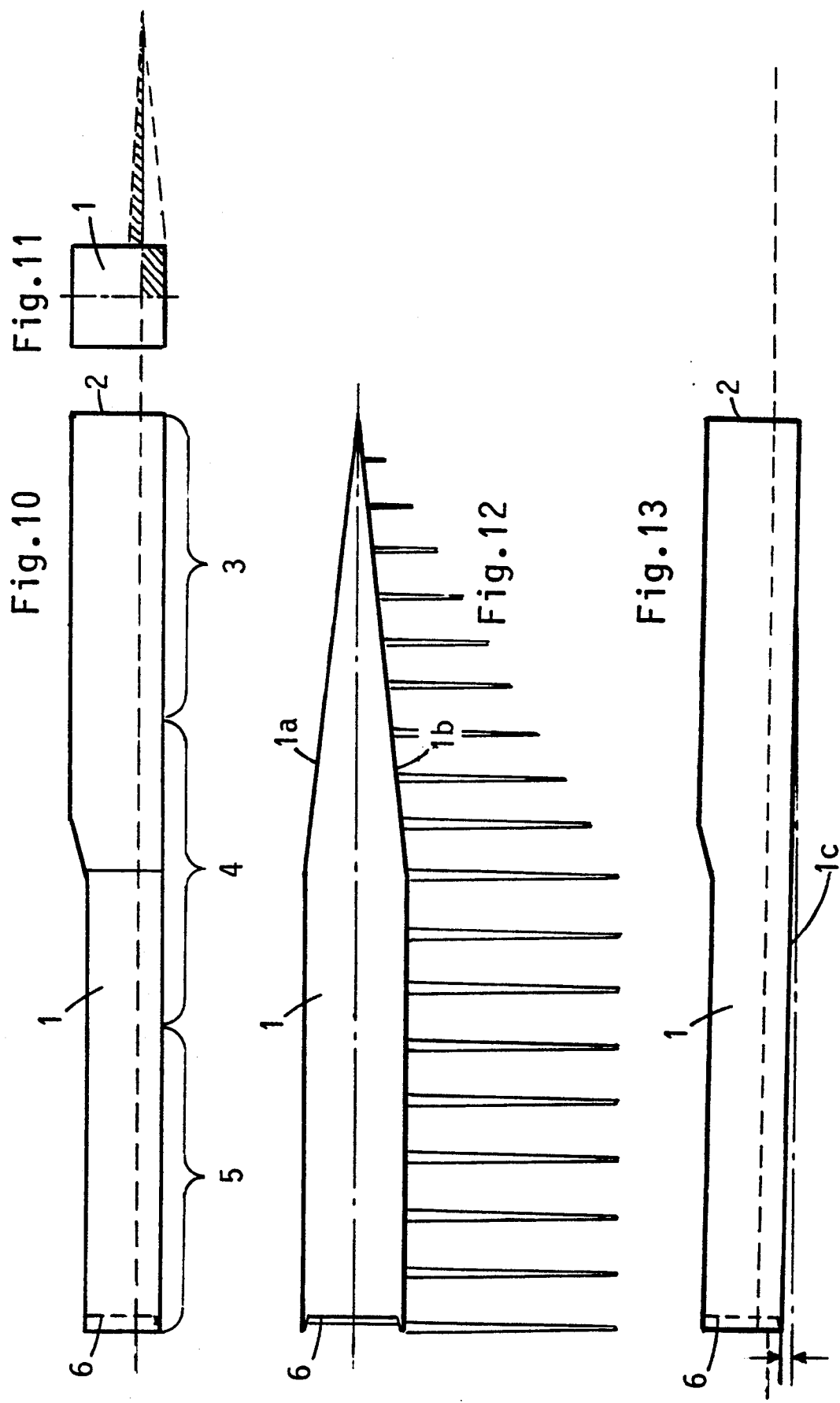

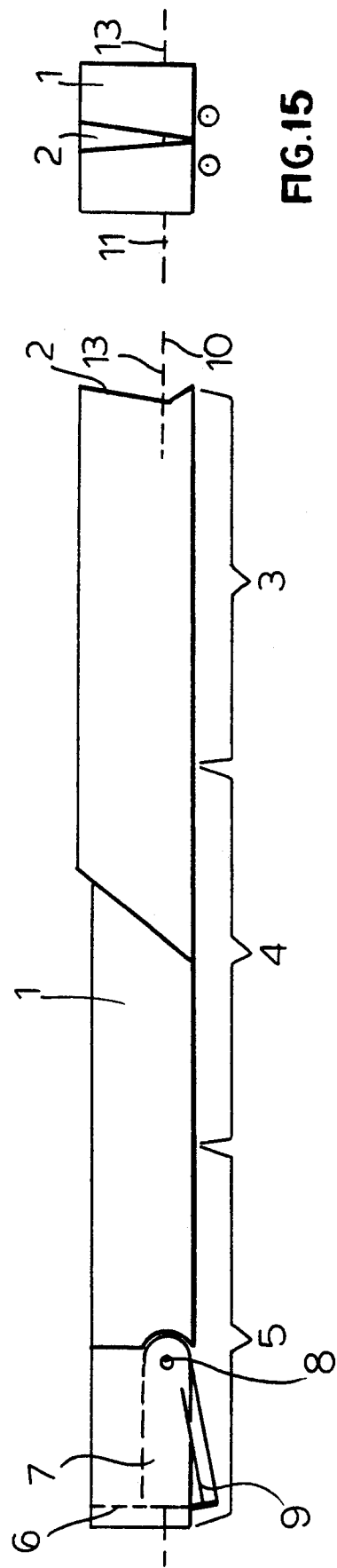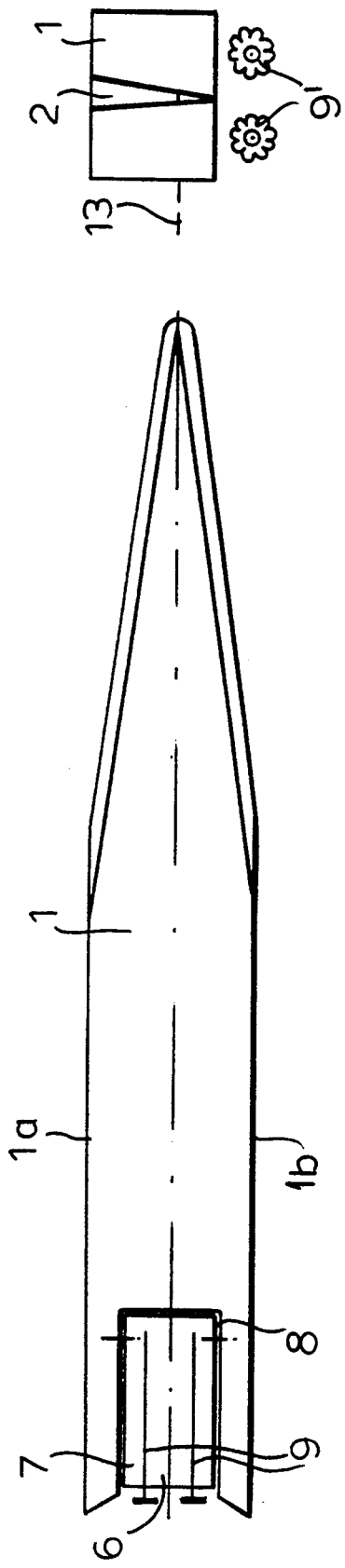

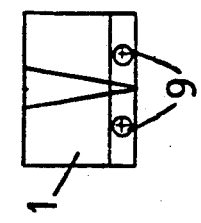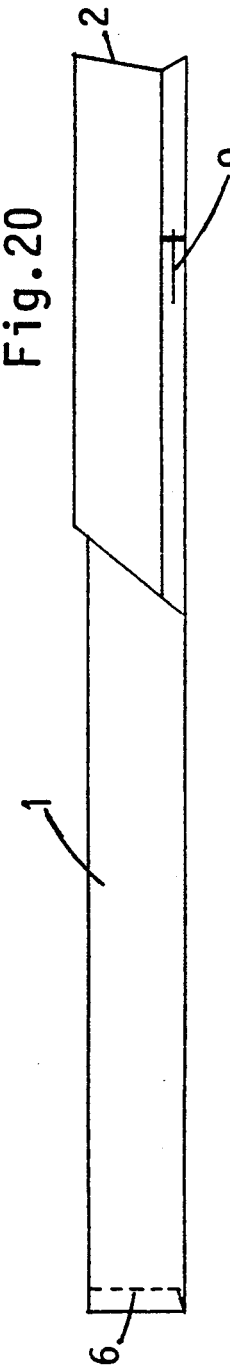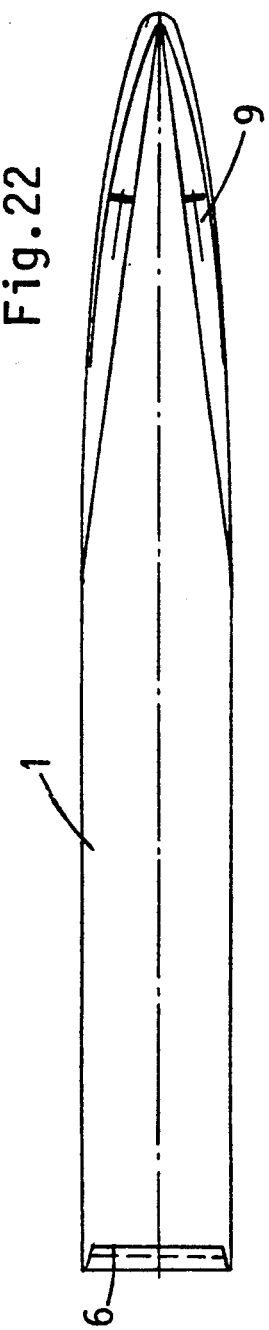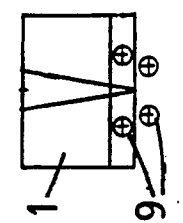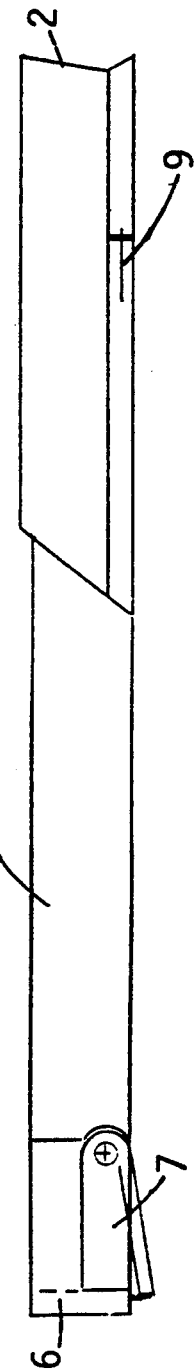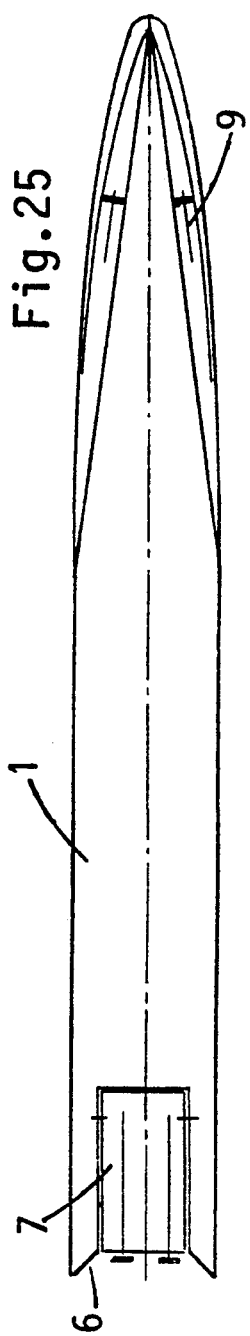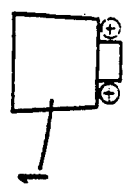

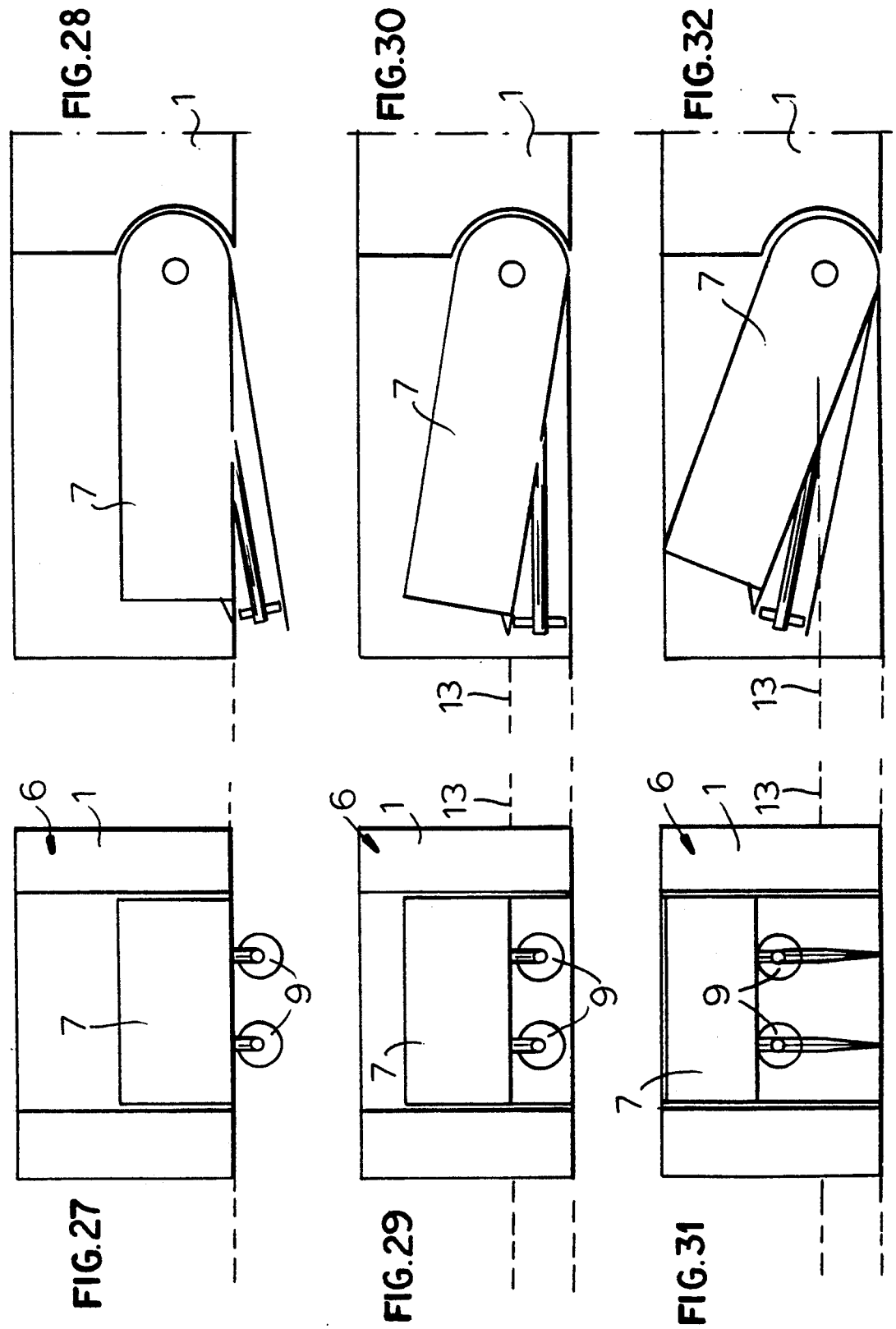

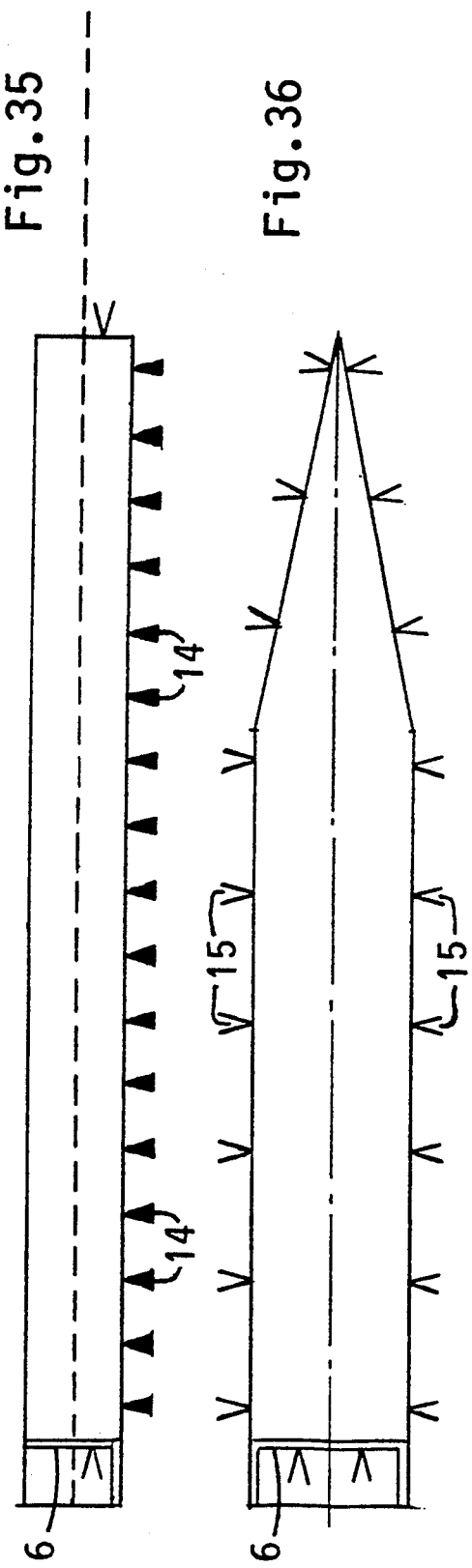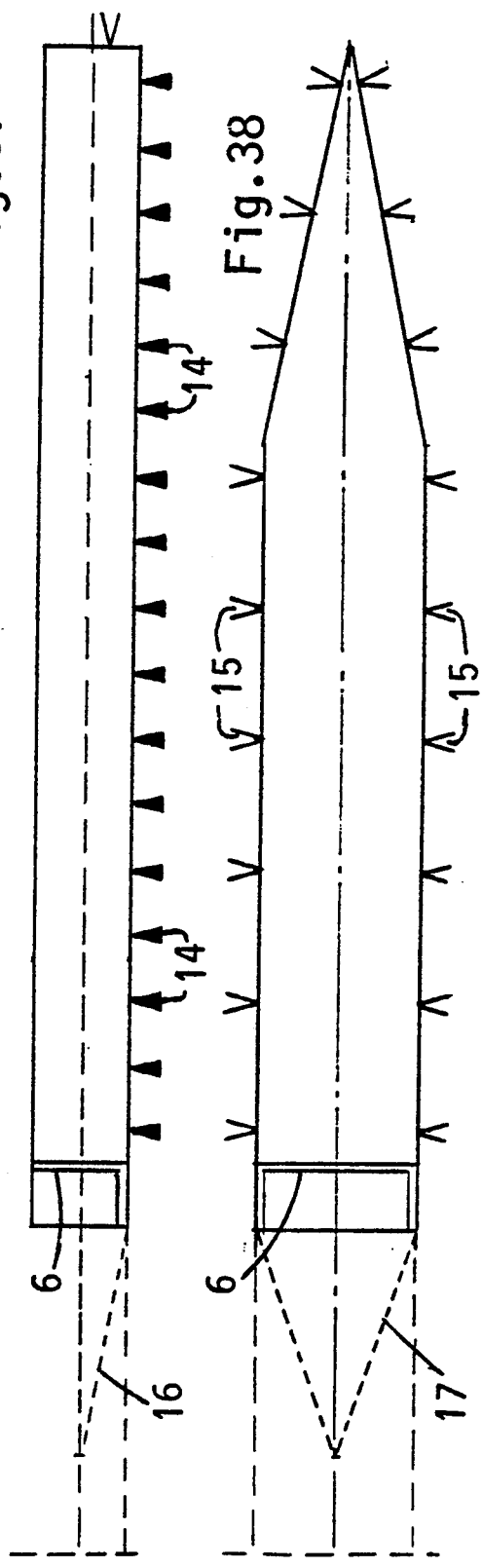

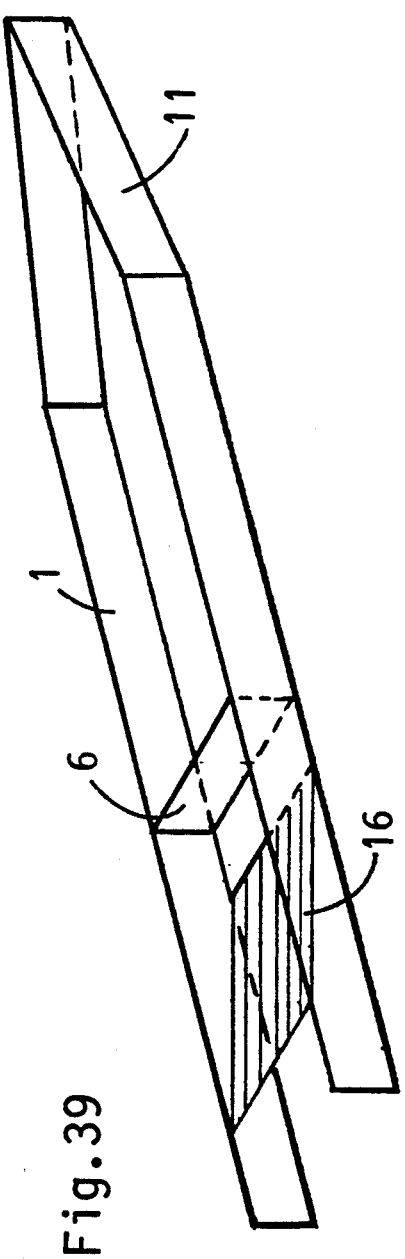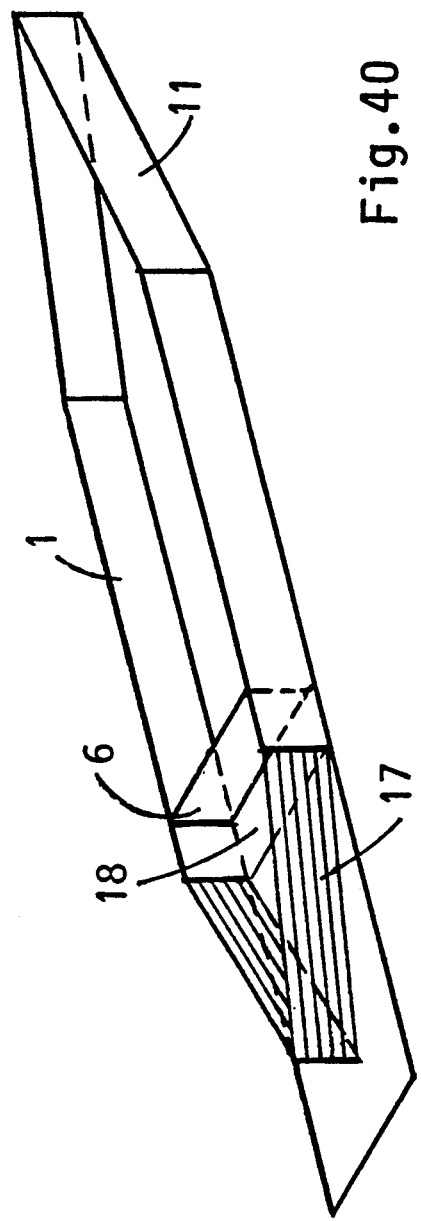
Fig.39
Fig.40

SHIP

FIELD OF THE INVENTION

My present invention relates to the flow-separation resistance at the stern of a ship and, more particularly, to a ship form providing highly economical power consumption.

OBJECTS OF THE INVENTION

The object of the invention is to build a ship which produces as low a suction as possible at the stern. Still another object of the present invention is to provide the propulsion units in an optimum position.

SUMMARY OF THE INVENTION

These objects are achieved according to the invention when the stern, at least in the region of the underwater body, forms a flat perpendicular surface to which the longitudinal axis of the ship is a normal, and when the hull, at least in the region of the underwater body, narrows towards the stern neither with the side surfaces nor with the bottom. The flow-separation resistance is thereby very small so that a large portion of the fuel can be saved.

The invention concentrates therefore on the effects of the ship form and the resulting power requirement. The shape of the hull according to the invention in the stern region of a ship substantially reduces the flow-separation resistance and the suction of the propeller and thus permits more efficient operation of displacement ships.

According to the invention the especially rectangular hull cross-section is retained below the water line from amidships essentially up to the end of the ship, that is, the stern. The streamlined narrowing in the rear third of the ship form is dispensed with.

Up to a speed of about 10 km/h, the water at the stern flows with turbulence after the ship. At higher speeds, a channel of about the width of the hull forms behind the stern in the water (FIG. 38), over the two side walls of which the water rushes from the two sides into the space of the channel.

The ratio of the length of the bottom to the side walls and the ratio of the side walls to the stern surface is naturally dependent upon the respective operating state, e.g. draft, speed, wave height, etc.

In an appropriate construction of the side walls and the bottom, the so-called wake of the water located behind the hull is thus dispensed with, since the clearance space resulting from the forward motion of the ship is filled by the air carried along behind the ship. In order to avoid a suction effect, i.e. a water wake, according to the invention it is necessary for the hull to end abruptly. Such structure can assure that the clearance space which forms behind the stern at an appropriately high speed will be filled with air. It is known that air is about 1000 times lighter than water. In addition, air is more flexible, since it is compressible. Consequently, the suction is correspondingly small and can be neglected.

This is why the propulsion is removed from the previous hull silhouette, which is the largest cross-section of the hull below the water line or the projection of this cross-section to the plane which is perpendicular to the longitudinal axis of the ship, and placed in the clearance space against which the water directly flows. According to the invention, the propulsion is located outside the hull silhouette.

Normally the propulsion cannot be arranged directly under the ship on account of possible damage. At different water depths, e.g. shallow water, it is necessary for the propulsion to be located shallower than the deepest point of the ship bottom.

For this reason, a ship according to the invention has an underwater body which is composed of one or more steps.

The steps, having straight-sided surfaces, extend over the entire length of the ship. The underwater body ends with a perpendicular stern end plate.

Advantageously the side walls of the ship project astern beyond the perpendicular stern end plate in extension of the hull. In addition, not only can the side walls extend beyond the hull, but the bottom plate can also be extended relative to the stern surface.

Due to the forward motion of the hull and thus also of the ship bottom when the ship is under way, the same buoyancy continues to prevail as in a hull at rest. During the forward motion, a pressure of water which is directly dependent upon the size of the transverse displacement of the water ($QV = B \times T$) primarily develops at the entire front end of the ship. This transverse displacement must be divided and removed in the truest sense of the word by the wedge-shaped fore body. At high speeds, e.g. 50 km/h and above, a banked-up water level develops in the front region, i.e. at the two side surfaces of the wedge, which banked-up water level, in ships of the previous type of construction, produces an enormous rise in the water surface, which initiates the formation of inherent waves.

In a ship according to the invention, the front resistance is overcome by one or more wedge units, the smallest wedge angle always being allocated to the greatest water depth. The propulsion elements consisting of propeller or turbine propeller are arranged in the recesses which are formed by the individual steps. The water always flows directly against the propulsion units. Furthermore, a ship according to the invention has one or more propulsion units which can be pivoted vertically about a radius and can thereby be adapted to different tasks.

Inherent waves in the bow region can be prevented in a ship according to the invention having a propulsion unit in the front region. By covering the wedge sides by the projection of the upper body, a type of channel is formed in which the striking flow is slightly accelerated. When this flow is caught by the propulsion at the appropriate location, a hard water column forms which bears against the side of the wedge and is limited at the top by the projection.

According to the invention the propulsion is located in the front half of the wedge length. The following half of the oncoming flow strikes the water column and is entrained, i.e. accelerated, by it. The water column cannot escape to the rear, since it is supported by the wedge surface. The entire displacement is therefore forced to escape laterally to the rear. The water volume of the transverse displacement is thus moved at an angle to the rear outside the forward-motion channel. In this way, the water flowing against the ship due to the forward motion of the ship is drawn away in the first half of the wedge, and a trough in the water surface develops there. The water, which is transported at an angle to the rear, forms a rise there in the water surface next to the ship. This rise naturally results in greater buoyancy. The trough in the water in the bow region and the rise of water in the stern region have an exceptionally positive effect on the requisite propulsion power. An effect of "moving down a gradient" occurs.

It depends on the output capacity of the propulsion whether few propulsion waves or no propulsion waves at all form. For example, if the propulsion is large and powerful enough and the breadth of the ship appropriate, it is no problem to remove all the water which has flowed against the ship. The effectiveness of the removal thus corresponds to the gain in efficiency during the front resistance.

BRIEF DESCRIPTION OF THE DRAWING

The above and other objects, features and advantages of the invention will become more readily apparent from the following description, reference being made to the accompanying highly diagrammatic drawing in which:

FIG. 1 is a side elevational view of a ship having one step per side over the entire length in the underwater region, FIG. 2 is a front view of FIG. 1;

FIG. 3 is a plan view of FIG. 1;

FIG. 4 is a view of a ship analogous to FIG. 1 but having two steps per side over the entire length in the underwater region;

FIG. 5 is a front view of FIG. 4;

FIG. 6 is a plan view of FIG. 4;

FIG. 7 is a perpendicular slim wedge before insertion into a water surface;

FIG. 8 is a perpendicular wedge partly immersed,

FIG. 9 is a perpendicular wedge fully immersed,

FIG. 10 is a side view of a ship having a wedge-shaped fore body;

FIG. 11 is a front view of FIG. 11;

FIG. 12 is a plan view of FIG. 10;

FIG. 13 is a side view of a ship with the effect of "moving down a gradient";

FIG. 14 is a side view of a ship having a propulsion rocking arm on the "after body", "deep water" position;

FIG. 15 is a front view of FIG. 14;

FIG. 15a is the front view of FIG. 14 showing a turbine;

FIG. 16 is a plan view of FIG. 14;

FIG. 20 is a side view of a ship having a propulsion unit on the fore body;

FIG. 21 is a front view of FIG. 20;

FIG. 22 is a plan view of FIG. 20;

FIG. 23 is a side view of a ship having propulsion units on the fore body and the after body; propulsion unit on after body in "deep water" position;

FIG. 24 is a front view of FIG. 23;

FIG. 25 is a plan view of FIG. 23;

FIG. 26 is a section at the level of the propulsion unit on the fore body according to FIG. 25;

FIG. 27 is the stern view of a ship according to FIG. 14, propulsion unit in "deep water" position;

FIG. 28 is the side view of the after-body region according to FIG. 27;

FIG. 29 is a stern view of a ship according to FIG. 14, propulsion unit in "shallow water" position;

FIG. 30 is a side view according to FIG. 29;

FIG. 31 is a stern view for the top position of the propulsion unit;

FIG. 32 is a side view according to FIG. 31;

FIG. 35 is a side view of a ship at rest;

FIG. 36 is a plan view of a ship at rest;

FIG. 37 is a side view of a ship at a speed of about 10–20 km/h, corresponding to about 3–6 m/s;

FIG. 38 shows the plan view of a ship at a speed of about 10–20 km/h, corresponding to about 3–6 m/s;

FIG. 39 is a schematic representation of the buoyancy forces at the stern on a ship in motion; and FIG. 40 is a schematic representation of the side forces at the stern on a ship in motion.

SPECIFIC DESCRIPTION

Figure 18:
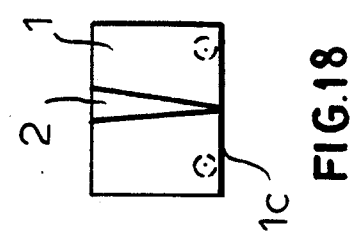
FIG. 18 is a front view of FIG. 17.

The hull 1 of the ship having a longitudinal axis L has two vertical side surfaces 1a, 1b and a horizontal bottom 1c which extend over more than half the length of the ship parallel to the longitudinal axis L and are flat (not curved). In all embodiments, the bottom 1c is horizontal and flat and thus parallel to the longitudinal axis L over the entire length of the ship. The perpendicular flat stern end plate 6 is normal to the longitudinal axis L. The two side surfaces 1a, 1b and the bottom 1c project beyond the plate 6 to such an extent as to ensure that the plate 6 remains free of water when the ship is under way.

Ships can have one or more steps 20 in the underwater area which extend over the entire length of the ship shown in FIGS. 1 to 6. The steps are designed in such a way that they start with a wedge angle in the bow area. The smallest wedge angle is allocated to the greatest water depth to make it easier to overcome the front resistance. The steps 20 are formed by straight surfaces 20a, 20b, of which one is perpendicular and the other horizontal.

The propulsion units can be propellers or turbine propellers and preferably placed in the recesses which are formed by the individual steps. Here, a certain position with regard to the longitudinal axis of the ship is not imperative. The propulsion units always lie outside the hull silhouette and the water always flows directly against them.

A ship built according to FIGS. 4 to 6 will have a minimum flow-separation resistance on account of the perpendicular stern end plate in the underwater area and a minimum front resistance on account of the gradual transverse displacement in the bow area. These are the most important pre-conditions for a more efficient operation than hitherto or alternatively for speeds not reached hitherto.

For better understanding of the transverse displacement, the perpendicular immersion of a slim wedge into a water surface is reproduced in three sections in FIGS. 7 to 9. It can easily be seen that the hatched areas in FIG. 9 are identical and corresponding to immersing of the ship in the water up to its waterline. On the basis of this knowledge, FIGS. 10 and 11 show the transverse displacement which is caused by a geometrically exact wedge. The paths along which the water travels at constant speed are shown in FIG. 12.

As a function of the speed of the ship, the water displaced by the bow wedge makes itself felt in a more or less pronounced rise by the water level along the entire hull and produces increased buoyancy there as represented diagrammatically by the hatched areas of FIG. 9. The result is that the ship effectively moves "down a gradient" as shown in FIG. 13. In addition, the formation of inherent waves, a hitherto serious disturbance and resistance factor, is reduced to a minimum by the measures described here.

Having a propulsion pivotable about a fulcrum or axis of the arm about an axis 8 stern (FIGS. 14 to 19). This arrangement of the propulsion is especially suitable for ships having conventional tasks and speeds.

Ships having propulsion under the fore body (FIGS. 20 to 22). In this novel arrangement of the propulsion units, an even greater fuel saving can be realised compared with the ship types according to FIGS. 14–19.

Ships having propulsion units under both the fore body and the after body (FIGS. 23 to 26). In this type of ship substantially higher speeds can be achieved at the same fuel consumption in contrast to conventional ships. These speed increases are substantially higher than is usual in present-day ships.

FIG. 14 shows the side view of a hull 1 having bow 2, fore body 3, midships section 4, after body 5 and perpendicular stern end plate 6. Located in the region of the after body 5 is a propulsion unit 7 which, with an adjustable housing mounted via a fulcrum, is constructed as a rocking arm 8. FIG. 15 reproduces the front view of FIG. 14 with the bow 2. FIG. 15A is analogous to FIG. 15 and shows an embodiment with a turbine 9a.

The plane view according to FIG. 16 shows that the rocking arm 8 is equipped with two propulsions 9 in the position for operation in deep water. The propulsion is located below the hull silhouette and thus the water flows freely against it. "Hull silhouette" is understood as the largest perpendicular cross-section of the hull below the water line. It is the projection of this cross-section to the plane to which the longitudinal axis of the ship is perpendicular.

Figure 17:
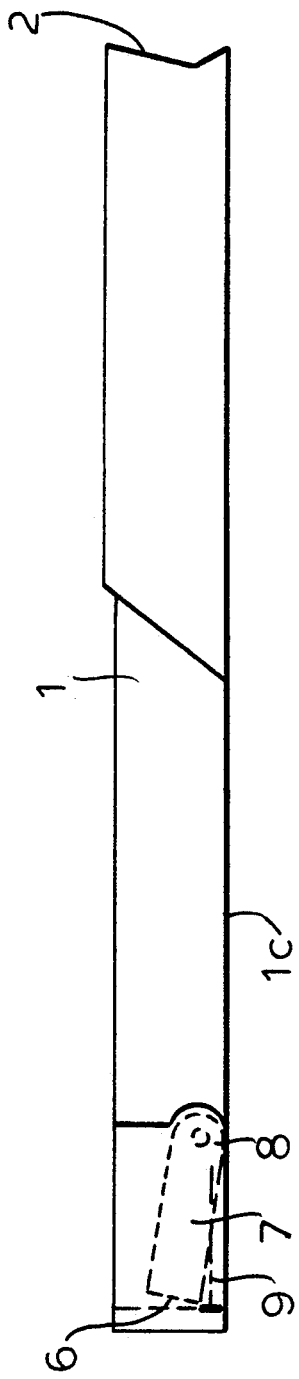
FIG. 17 is a side view of a ship having a propulsion rocking arm in the "shallow water" position.
Figure 19:
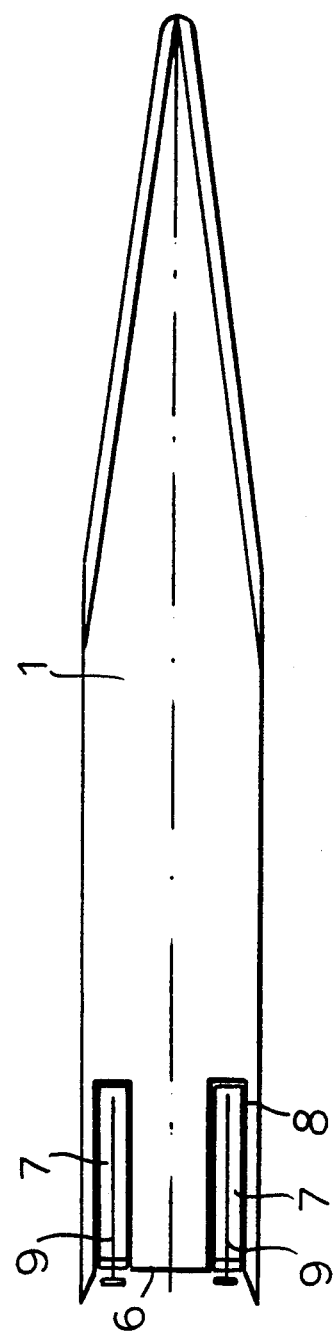
FIG. 19 is a plan view of FIG. 17.

In the further exemplary embodiment according to FIGS. 17 to 19, the propulsion of the ship is effected via two separate propulsion units 7 which are accommodated in two housings having one propulsion 9 each. Both rocking arms 8 are positioned in such a way that ship operation in shallow water is ensured. Here, too, the stern is characterized by the perpendicular stern end plate.

FIGS. 20–26 show two hulls of completely different design. The hull 1 is equipped with firmly installed propulsion 9. The propulsion units 9 are located in a type of recess 20 of the fore body 3 below the abovewater body 10 and at the side of the underwater body 11 also shown in FIG. 14. This arrangement is particularly apparent from FIGS. 21, 24 and 26. FIGS. 21 and 22 show that the propulsions 9 are located in front of the hull silhouette and therefore the water flows directly against them. The propulsions 9 are preferably arranged in the first half of the wedge-shaped bow 2 or of the fore body 3.

FIGS. 23–26 show a combination of the hulls of FIGS. 14–17 and FIGS. 20–22. It is apparent that all propulsions 9 are located or can be located outside the hull silhouette. The arrangement of the propulsion units 9 in the recesses 20 of the fore body is apparent from FIG. 26.

FIGS. 27–32 show the various positions of the propulsion unit 7 in the stern views and in the side views. Here, FIGS. 27 and 28 represent the most important positions, namely that the propulsion 9 is located below the hull silhouette and as a result the water flows directly against it. This position is suitable for high ship speeds. FIGS. 29 and 28 show the position of the propulsion rocking unit 7 which is used only in shallow water, i.e., for example, in harbors, when the ship is moving slowly. The top position of the propulsion 9 is shown in FIGS. 31 and 32. Here, the propulsion 9 is located above the water line 13. This position shows the possibility for inspection and maintenance or repair. In this position, there is also no adverse effect on the remaining operable units in the event of a failure in the propulsion 9. Furthermore, this position can be used when sails are used as propulsion.

Figure 34:
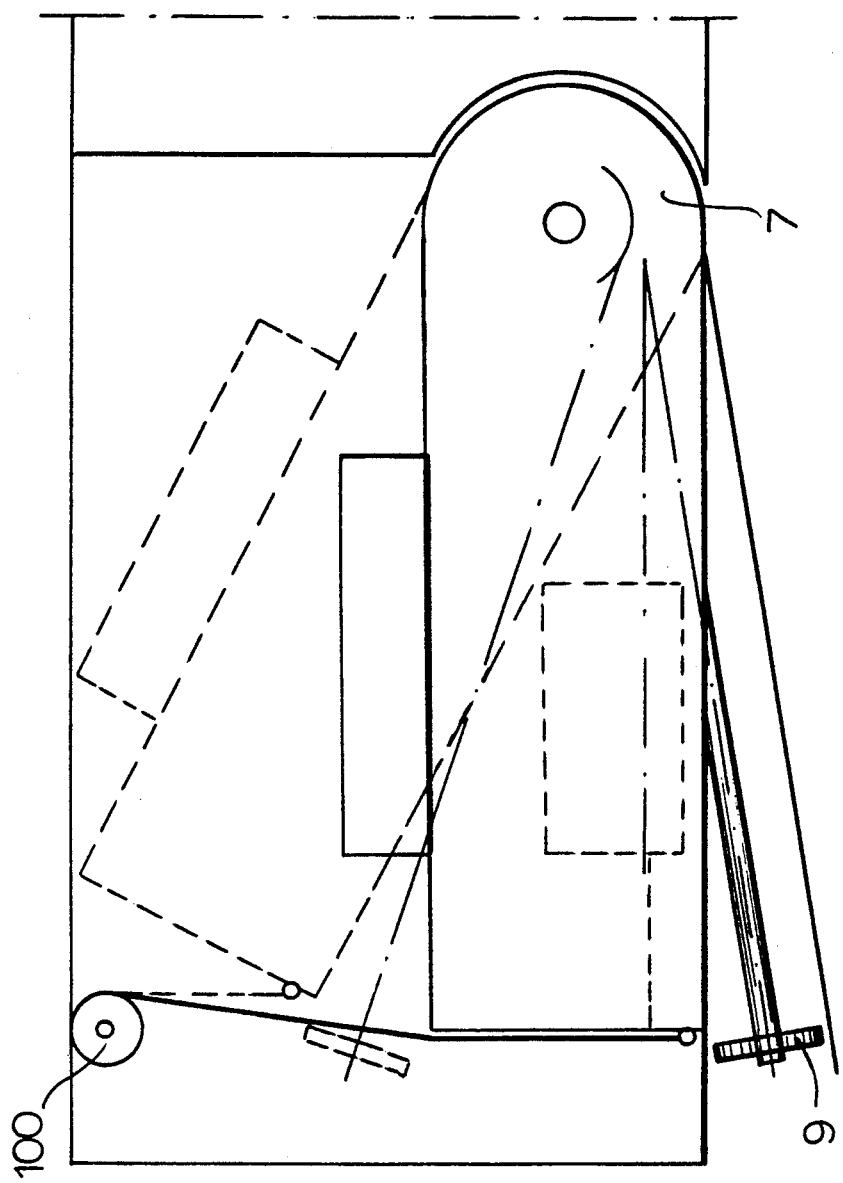
FIG. 34 is a side view of the after-body region according to FIG. 33, partial section of main and secondary units.
Figure 33:
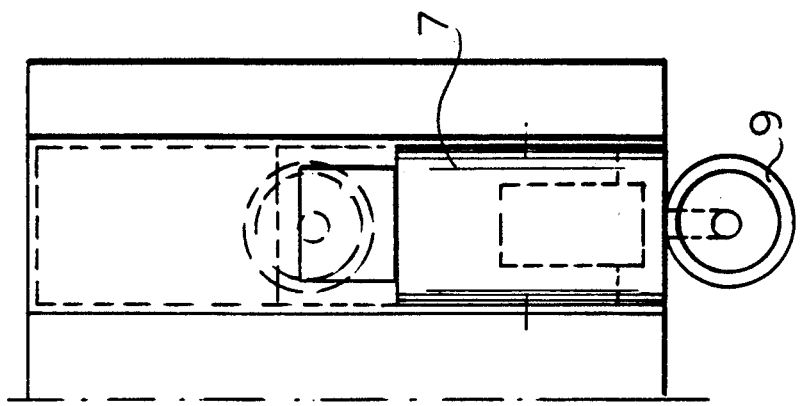
FIG. 33 is part of the stern view of a ship from FIG. 19 having a propulsion unit, position of the rocking arm for the areas "deep water" and "inspection-maintenance sailing"

FIG. 33 shows the sectional stern view and FIG. 34 shows the sectional side view of the propulsion housing from FIGS. 17 and 19 having the installed propulsion unit 7 and the associated propulsion 9. It is apparent from FIG. 34 that the entire unit can be continuously adjusted to the height required for the respective purpose via an adjusting means, e.g. a rope winch 100. The propulsion rocking arm 8 can be locked in each position via a corresponding linkage or clamping cylinder. Resistance-free flow of the water located below the ship is ensured without problem by the adaptation of the hull 1 in the lower stern region to the radius of the rocking arm.

FIGS. 35–38 qualitatively show in schematic representations the build-up of the buoyancy 14 and the side pressure 15 of a ship at rest and in motion, (which ship has a perpendicular stern end plate. FIG. 35 reproduces a side view of a ship at rest. The solid arrows represent the buoyancy forces. FIG. 36 shows the same ship in plan view. The arrows 15 used there represent the water forces acting on the outer walls. FIG. 37 represents the same ship as in FIG. 35 but having a speed of about 10–20 km/h, corresponding to about 3–6 m/s. The broken sloping line 16 behind the stern represents the rising water of the buoyancy forces from FIG. 35. FIG. 38 shows the same ship as FIG. 36 but having a speed of about 10–20 km/h, corresponding to about 3–6 m/s. The two broken sloping lines 17 behind the stern 6 represent the areas of the water flowing together, caused by the shifted outer walls.

FIGS. 39 and 40 serve to clearly illustrate the behavior of the water when a ship having a perpendicular stern end plate is under way.

FIG. 39 shows the behavior of the water which is located below the hull 1. It forms the rising area 16. The buoyancy forces at the stern of the ship become free due to the motion of the ship. If the side walls are imagined to be theoretically extended, the water surface for this phase of the sequence of motion develops as sketched in FIG. 39.

FIG. 40 shows the behavior of the surrounding water at a theoretically extended bottom. During the movement of the side walls of the ship, a water surface as indicated in FIG. 40 appears. The water flows together behind the stern in accordance with the perpendicular areas 17. The combination of the water surfaces from FIGS. 39 and 40 approximately reproduces the formation of the water surface at the stern of a ship a shown in FIG. 38, i.e. a triangular pyramid-shaped trough is formed into which the air carried along behind the hull can fall. At no point in the sequence of motion can a decrease in or an absence of the buoyancy forces be observed. Via the walls 17, the water rushes from the sides from the top into the clearance space 18 formed by the areas 16 and 17.

I claim:

1. A displacement ship comprising:
   a hull extending along a hull axis and immersing in the water, whereby said hull is provided with an underwater body, said hull being formed with:
   a bow, and
   an afterbody extending rearwardly from said bow and formed with a stern, said stern being provided with a surface extending perpendicular to said hull axis,
   two sides running astern from said bow, said sides extending parallel to said hull axis at least in a region of said underwater body and along said afterbody,
   a bottom extending toward said stern from said bow and bridging said sides, said underwater body being formed with an area having a largest cross section of said hull and being provided with a plurality of continuous longitudinal recesses formed with respective straight-sided faces adjoining each other and having wedge angles of different sizes; and
   propulsion means for advancing said ship mounted on said hull outside of said area.

2. The ship defined in claim 1 wherein said sides and said bottom project axially rearwardly beyond said stern.

3. The ship defined in claim 2 wherein said sides project beyond said stern for a distance greater than a distance for which said bottom projects beyond said stern.

4. The ship defined in claim 1 wherein said propulsion means includes a propeller mounted in one of said recesses.

5. The ship defined in claim 1, further comprising a housing mounted on said underwater body and pivotal about a pivot axis extending perpendicular to said hull axis and receiving said propulsion means.

6. The ship defined in claim 5, further comprising auxiliary units and engines for actuating said propulsion means received in said housing.

7. The ship defined in claim 5 wherein said housing has an angular position, said propulsion means including at least one propeller, said propeller being located above a water level in said angular position of said housing.

8. The ship defined in claim 5, further comprising an upper body extending axially above the underwater body and formed with means for limiting pivoting of said housing.

9. The ship defined in claim 1 wherein said propulsion means includes a turbine.

10. The ship defined in claim 1 wherein said sides converge axially toward said bow ahead of said afterbody, said propulsion means being mounted on said bow and lying in a plane parallel to a respective plane of each of said sides in said region of said bow.

* * * * *